United States Patent [19]

McManus

[11] Patent Number: 5,098,006
[45] Date of Patent: Mar. 24, 1992

[54] HEADER JIG

[75] Inventor: John R. McManus, Marcellus, N.Y.

[73] Assignee: Carrier Corporation, Syracuse, N.Y.

[21] Appl. No.: 729,665

[22] Filed: Jul. 15, 1991

[51] Int. Cl.5 .................. B23K 1/18; B23K 101/14; B23K 37/053
[52] U.S. Cl. ................................ 228/42; 228/49.3; 29/890.052
[58] Field of Search .............. 228/42, 49.1, 49.3; 29/890.052, 890.08

[56] References Cited

U.S. PATENT DOCUMENTS

| | | | |
|---|---|---|---|
| 2,387,154 | 10/1945 | Kalwitz | 29/148 |
| 2,824,536 | 2/1958 | Gamble | 113/104 |
| 2,928,364 | 3/1960 | Davis | 113/99 |
| 3,238,606 | 3/1966 | Tolson | 29/890.052 |
| 4,338,712 | 7/1982 | Dearman | 29/281.6 |
| 4,611,743 | 9/1986 | Williams | 228/49.1 |
| 4,615,514 | 10/1986 | Hamlin | 269/41 |
| 5,040,716 | 8/1991 | Stetz | 228/42 X |

Primary Examiner—Kenneth J. Ramsey

[57] ABSTRACT

A jig for use in manufacturing header assemblies from pipe and tubing. The jig assures the proper orientation and alignment of components during fit up and joining of component parts into a complete header assembly. In addition, the jig is configured to direct a flow of a purge gas that blankets the interior surfaces of the header assembly during a joining process such as soldering, brazing or welding and thus prevents oxidation of those surfaces.

5 Claims, 2 Drawing Sheets 5,098,006

HEADER JIG

BACKGROUND OF THE INVENTION

This invention relates generally to devices used in manufacturing assemblies from metal pipe and tubing. More particularly, the invention relates to a jig for use in fitting up and joining header assemblies used in heat exchangers. The jig includes an integral gas purging capability.

A header, sometimes called a manifold, is a conduit into which a plurality of other conduits open. Headers are widely used in a variety of applications, particularly in the air conditioning and refrigeration industry. A typical application in that field is in conjunction with tube type heat exchangers. In order to reduce the total pressure drop across a given heat exchanger, the refrigerant flow through the heat exchanger may be split into two or more parallel flow paths, or circuits. This is done by installing an inlet header and an outlet header on the upstream and downstream sides of the heat exchanger, respectively. The inlet header receives a flow of refrigerant from a single conduit and distributes the flow to the various parallel flow paths in the heat exchanger. The outlet header receives the flow from the parallel flow paths and directs a single flow of refrigerant to components downstream of the heat exchanger.

Tube type heat exchangers used in air conditioning and refrigeration applications are generally made of copper pipe or tube. Headers used in the same applications are also generally made of copper pipe or tube. Such a header comprises a pipe or tube of a relative larger diameter having smaller diameter tubes that join into it. In a typical manufacturing operation for the large scale production of heat exchangers, header assemblies are usually prefabricated with short nipples, or stubs, of tube of an appropriate diameter extending from the header at appropriate positions and orientations. The prefabricated header assembly is then assembled to its heat exchanger by joining the nipples to the heat exchanger tubing to form the parallel flow paths.

Tube nipples are generally joined to a header by insertion into appropriately prepared apertures in the ends or side-wall of the header tube. The nipples are then joined to the header by a process such as soldering, brazing or welding to form a joint that is both fluid tight and mechanically sound. There is usually a shoulder formed in or attached to a nipple at an appropriate distance from the end to be inserted into the header in order to improve the quality of the finished joint and to assure the correct insertion distance.

If the nipple is fitted up and joined to the header manually by an assembly worker, as is frequently the case, the nipple alignment is dependent on the skill of the worker. Even slight misalignment of a nipple can complicate assembly of a header to a heat exchanger. One technique for attaining the proper fit in a finished header is to bend the nipples to the correct alignment using, for example, an aligning jig. But such a procedure is labor intensive, can subject the nipples and the nipple joint to excessive stress and introduces another step into the heat exchanger assembly process. Manual joining of nipples to the header is in itself time consuming and labor intensive.

In order to properly braze a joint, the metal surrounding the joint must be heated to a relatively high temperature. In a copper header and nipple assembly of the size and configuration used in the typical air conditioning or refrigeration heat exchanger, the entire assembly will be subjected to high temperatures. At high temperatures and in the presence of oxygen, copper will oxidize. Thus copper oxides may form on and in the header assembly during brazing, either as loose particles or as an oxide coating on the tube walls. A brazed header assembly must be free of copper oxides before it is installed into a refrigeration system, for loose particles may cause damage to other system components, e.g. the compressor. It is not sufficient to remove just the loose particles, for particles may become detached from the coating some time after header assembly to contaminate the system. The interior of header assemblies can be cleaned to remove the oxides of copper, but the cleaning process is difficult and expensive.

It is axiomatic that, even at high temperatures, in the absence of oxygen, copper will not oxidize. Oxygen can be excluded from contact with hot copper by blanketing the surfaces with a suitable gas. Thus, a gas purge of the interior of a header assembly during brazing of the nipples will prevent the formation of copper oxides, leaving bright interior surfaces that do not require cleaning. Such a purge must, however, blanket the entire internal surface of the header assembly and therefore there must be provisions to insure that the purge gas can reach all interior areas of the header assembly.

SUMMARY OF THE INVENTION

The present invention is a jig for ensuring proper fit up and alignment of nipples during assembly and joining to a header. The jig includes a purge gas system. The purge gas is distributed to all regions of the interior of the header and nipple assembly so that oxygen is excluded and thus oxidation of the interior surfaces prevented.

The key component of the jig is a nipple alignment and holding apparatus. The apparatus has nipple support sleeves that are fixed to a purge gas manifold in the same relative position and alignment as the tubes with which the header nipples will mate. Thus, when nipples are inserted into the sleeves, they will be in the alignment necessary for assembly into a heat exchanger. The purge gas manifold is generally cylindrical with its longitudinal axis oriented generally horizontally. The apparatus may be rotated about the longitudinal axis. Except for its freedom to rotate, the apparatus is fixed with respect to a header support means. When a header is placed in the header support means, the longitudinal axis of the header is properly oriented to the purge manifold axis. When resting in the header support means, the header is also at a distance from the nipple support sleeves that results in the nipples being properly positioned in the header. Because the alignment and holding apparatus rotates, it may be moved to a convenient position for fitting up the nipples and header into a complete assembly. The alignment and holding apparatus is then moved so that the header rests in the header support member. In this position, the header and nipples are fixed with respect to each other and in the proper relative positioning to insure a correct fit when the header assembly is assembled into a heat exchanger. The jig holds the assembly in the proper position for manual brazing or brazing by an automatic or semiautomatic process.

There is a gas, for example nitrogen, supplied to the purge gas manifold. The nipple sleeves are in fluid flow communication with the manifold. Gas flows from the gas supply through the manifold, the nipple sleeves, the nipples and the header and exits the header through a convenient opening. Supplying gas to all the nipples insures that the gas reaches and blankets all of the internal surfaces of the nipples and the header, thus preventing oxidation of those surfaces during brazing operations.

BRIEF DESCRIPTION OF THE DRAWINGS

The accompanying drawings form a part of the specification. Throughout the drawings, like reference numbers identify like elements.

DESCRIPTION OF THE PREFERRED EMBODIMENT

Figure 1:
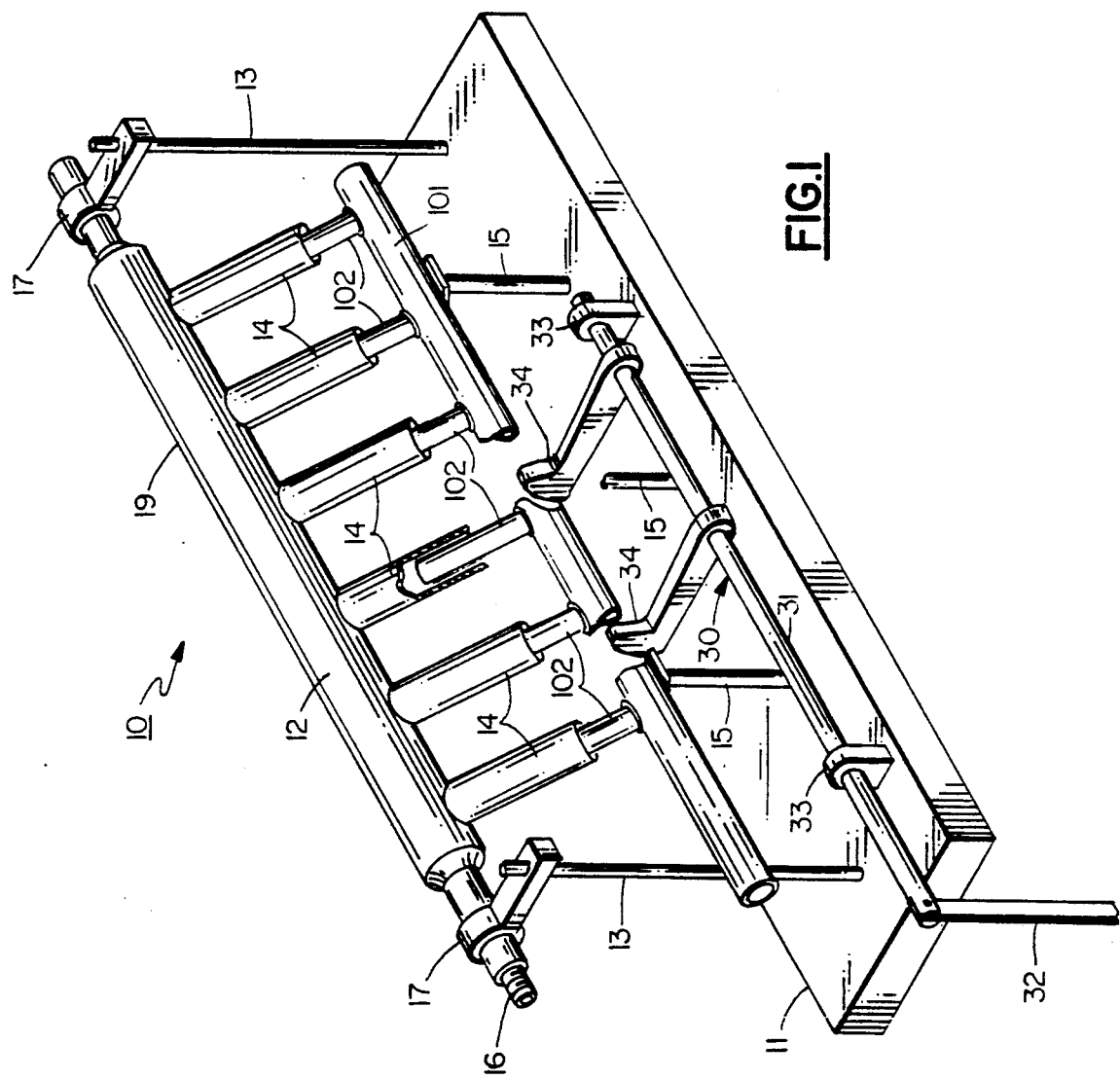
FIG. 1 is a isometric view of one embodiment of the jig of the present invention.
Figure 2:
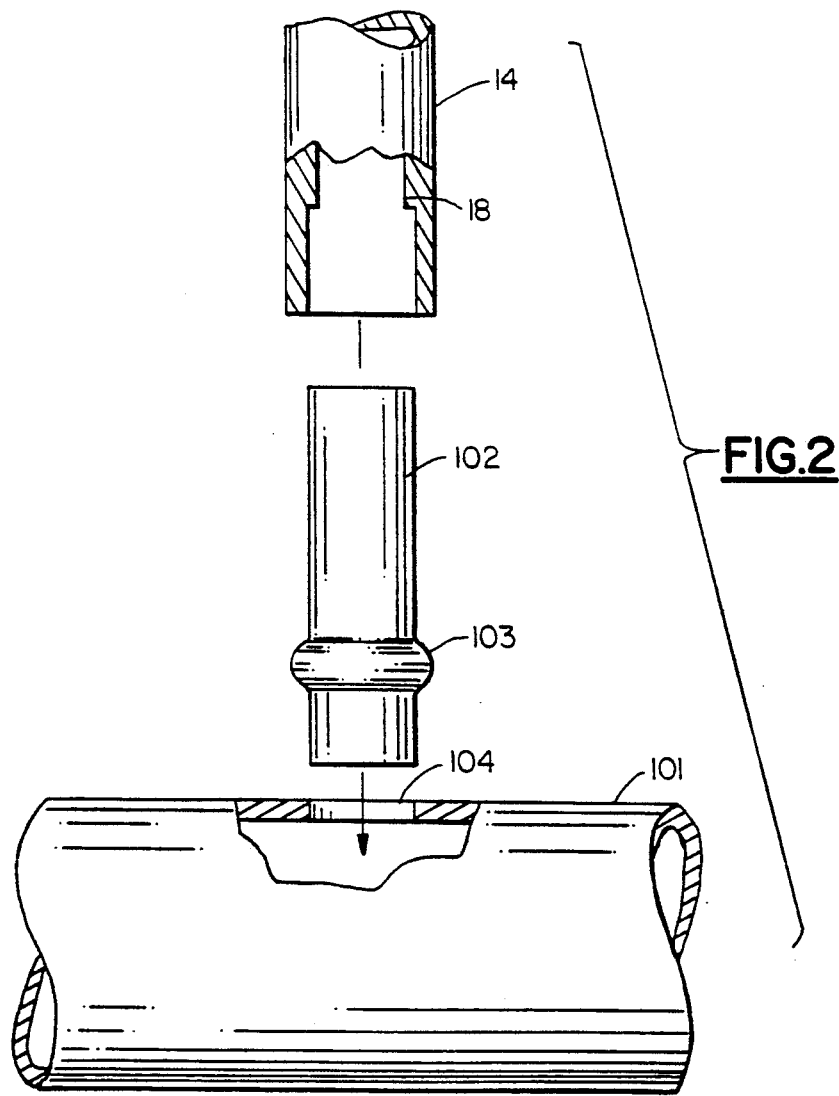
FIG. 2 is an assembly elevation view, partly broken away, of a portion of a nipple sleeve of the jig of the present invention as well as a portion of a workpiece nipple and header.

FIG. 1 depicts, in an isometric view, a header jig embodying the present invention. FIG. 2 provides a detail assembly view of the nipple sleeve of the jig of the present invention as well as a portion of a workpiece header and nipple. In FIG. 1 is shown header jig 10 having jig base 11. Fixed to base 11 are workpiece support members 15, having at their upper extremities provisions for holding a workpiece header. Such a header 101 is shown for illustrative purposes. Also fixed to base 11 are nipple alignment and holding apparatus support members 13. Each holding apparatus support member 13 has a bearing 17 at its upper extremity. Mounted in bearings 17 is nipple alignment and holding apparatus 19. Holding apparatus 19 comprises generally cylindrical manifold 12 to which are affixed one or more nipple sleeves 14. The orientation of the longitudinal axis of manifold 12 is fixed with respect to jig base 11 and thus to the axis of a workpiece header placed in workpiece support members 15, but holding apparatus 19 may rotate about the longitudinal axis of manifold 12 in bearings 17.

Manifold 12 and nipple sleeves 14 are most conveniently manufactured from rigid pipe of appropriate dimension and heat resistance. Nipple sleeves 14 are sized so that their inner diameter is slightly larger than the outer diameter of the tubing that is used to form workpiece nipples 102 that will be used to join with header 101 to form a completed header assembly. Nipple sleeves 14 are in fluid flow communication with manifold 12 so that a gas introduced into holding apparatus 19 through gas supply fitting 16 will flow through manifold 12 and then out of manifold 12 through nipple sleeves 14.

The relative positions of the tube ends in the heat exchanger on which the completed header assembly will be mounted are known. Nipple sleeves 14 are mounted on manifold 12 so that they are in that same relative position. Therefore, when nipples 102 are inserted into and held in place by nipple sleeves 14 and then joined to header 101 by a suitable process such as brazing, the nipples will be correctly oriented to mate with the tube ends in the heat exchanger.

In a separate manufacturing step, workpiece headers 101 are prepared by cutting pipe or tubing to an appropriate length and drilling nipple holes 104 (FIG. 3) at appropriate points in the wall of the header. A particular header assembly design may also call for nipples at an end or ends of a header in which case the end or ends would also be prepared to receive nipples. In still another separate step, nipples 102 are prepared by cutting pipe or tubing to an appropriate length and by forming a protruding bead or shoulder 103 (FIG. 3) at an appropriate distance from one end of the nipple by an appropriate process. Shoulder 103 assures the insertion of nipple 102 into nipple hole 104 the proper distance and also provides a good mechanical joint for the joining process. Either the header preparation step or the nipple preparation step may include pipe or tube bending as a substep.

In a typical header assembly manufacturing process, an operator rotates nipple alignment and holding apparatus 19 so that nipple sleeves 14 are at a convenient angle. The operator then inserts appropriate nipples 102 into appropriate nipple holes 104 in header 101 until shoulders 103 contact the header. The operator then inserts nipples 102 into nipple sleeves 14. Nipple sleeve internal shoulder 18 (FIG. 3) insures proper insertion distance. The operator then rotates nipple alignment and holding apparatus 19, containing the assembled header assembly, down until header 101 rests in workpiece support member 15. With a header assembly loaded and positioned in header jig 10 in this manner, nipples 102 are properly inserted into header 101 and properly aligned by nipple sleeves 14, and the header assembly is held in place for joining the nipple to the header by an appropriate process such as soldering, brazing or welding by a manual, semiautomatic or automatic joining process.

Figure 3:
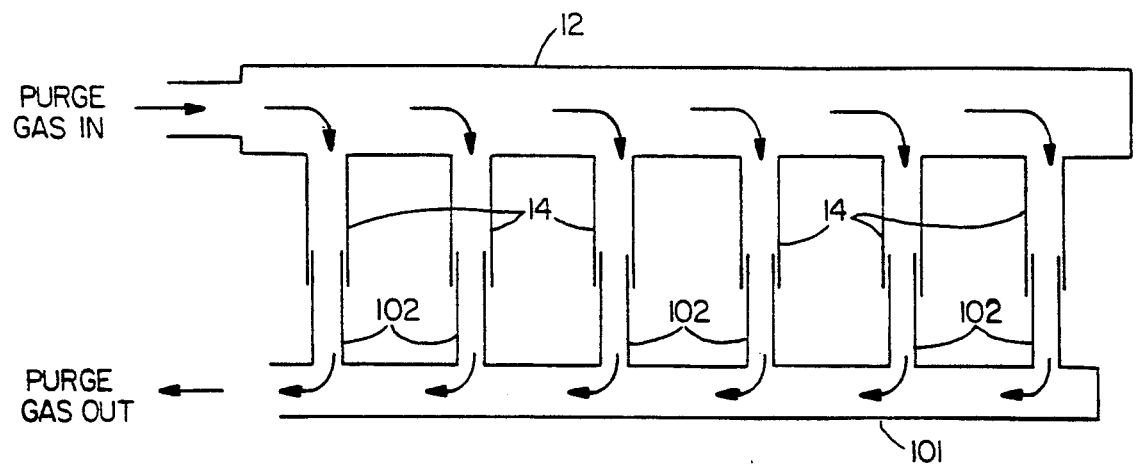
FIG. 3 is a schematic of the purge gas flow through the jig of the present invention and a workpiece header assembly.

A supply of an appropriate purge gas, such as nitrogen, is connected to gas supply fitting 16. FIG. 3 is a schematic of the purge gas flow path through header jig 10 and a workpiece header assembly. Before commencing the joining process, the operator starts a flow of purge gas into nipple alignment and holding apparatus 19. The gas flows through manifold 12 and nipple sleeves 14 into nipples 102 and then into the interior of header 101. The purge gas blankets the interior surfaces of nipples 102 and header 101, excluding oxygen that would otherwise contact those surfaces and thus prevents the formation of copper oxides on the interior surfaces in the high temperature environment caused by the joining process. Because purge gas flows through all of the nipples, the gas is able to completely blanket the interior surfaces of the header assembly.

A useful auxiliary to header jig 10 is stripper assembly 30. After the brazing or other process, a completed header assembly may still be extremely hot for some time, causing handling problems even to an operator wearing gloves.

Stripper assembly 30 allows the removal of the hot header assembly without manual contact by the operator. Stripper assembly 30 comprises stripper arms 34 fixed to stripper shaft 31. Stripper shaft 31 is mounted to jig base 11 in stripper shaft bearing and support members 33 so that shaft 31 may rotate about its longitudinal axis in bearing and support members 33. To remove a header from jig 10, the operator rotates shaft 30 using operating handle 32 so as to raise stripper arms 34 to contact header 101. Further rotation of shaft 30 causes stripper arms 34 to draw header 101 out of workpiece support members 15 and nipples 102 out of nipple sleeves 14, removing the header assembly from the jig.

One skilled in the art will appreciate that the header jig depicted in FIG. 1 is capable of use in the production of one or, at the most, a very few specific header assembly configurations. Such a person will also appreciate that in a modern manufacturing operation, there will be requirements to make a wide variety of header configurations. This requirement may be satisfied by making a header jig that has adjustable workpiece and manifold support members and a number of appropriately configured nipple alignment and holding apparatus. A change in header configuration requirements could then be accommodated by adjustments in the support members and installation of the proper alignment and holding apparatus. That capability is contemplated within the scope of this invention.

However, jig reconfiguration can be laborious and time consuming. The materials needed to make a header jig as described above are readily available and relatively inexpensive. It is probably more time and cost effective, therefore, to fabricate a separate and complete jig for every header assembly configuration that is required.

What is claimed is:

1. A jig for fit up of and joining nipples to a header to form a header assembly comprising:
   a jig base;
   means for supporting a header workpiece in fixed orientation with said base;
   a nipple alignment and holding apparatus having
      a purge manifold, with a longitudinal axis and purge gas inlet means, and
      a nipple sleeve affixed to and in fluid flow communication with said purge manifold;
   means for supporting said nipple alignment and holding apparatus in fixed orientation with said base and said header workpiece while allowing rotation of said nipple alignment and holding apparatus about said manifold longitudinal axis; and
   means for supplying purge gas to said purge gas inlet means.

2. The jig of claim 1 further comprising stripper means for removing completed header assemblies from said jig.

3. The jig of claim 2 in which said stripper means comprises:
   a stripper shaft having a longitudinal axis that is parallel to said manifold longitudinal axis;
   bearing and support means for supporting said stripper shaft in fixed relationship to said jig base and allowing rotation of said stripper shaft about said stripper shaft longitudinal axis;
   a stripper arm fixed to and extending outwardly said stripper axis; and
   means for rotating said stripper shaft about said stripper longitudinal axis.

4. The jig of claim 1 in which
   said header workpiece support means is adjustable to accommodate header workpieces of varying sizes and configurations and
   said nipple alignment and holding apparatus support means further comprises adjustable means for accommodating nipple alignment and holding apparatus of varying sizes and configurations and in varying orientations with respect to said header workpiece support means.

5. The jig of claim 1 in which said nipple sleeve has means for preventing insertion of a nipple into said sleeve a distance greater than a predetermined amount.

* * * * *